(12) United States Patent
Singla et al.

(10) Patent No.: US 11,750,448 B2
(45) Date of Patent: Sep. 5, 2023

(54) NETWORK DEVICE-INTEGRATED ASSET TAG-BASED ENVIRONMENTAL SENSING WITH MUTUAL AUTHENTICATION

(71) Applicant: HEWLETT PACKARD ENTERPRISE DEVELOPMENT LP, Houston, TX (US)

(72) Inventors: Nitin Singla, Bangalore (IN); Yashavantha Nagaraju Naguvanahalli, Bangalore (IN); Sunil Jayadevappa, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 466 days.

(21) Appl. No.: 16/530,536

(22) Filed: Aug. 2, 2019

(65) Prior Publication Data
US 2021/0036918 A1 Feb. 4, 2021

(51) Int. Cl.
*H04L 9/40* (2022.01)
*H04L 67/00* (2022.01)
*H04L 41/0806* (2022.01)
*H04W 24/10* (2009.01)
*H04W 64/00* (2009.01)
*H04W 12/069* (2021.01)
(Continued)

(52) U.S. Cl.
CPC ...... *H04L 41/0806* (2013.01); *H04L 61/5014* (2022.05); *H04L 63/0869* (2013.01); *H04W 12/069* (2021.01); *H04W 24/10* (2013.01); *H04W 64/00* (2013.01); *H04L 67/34* (2013.01); *H04L 2101/618* (2022.05)

(58) Field of Classification Search
CPC ............ H04L 41/0806; H04L 61/2015; H04L 63/0869; H04L 61/6018; H04L 67/34; H04W 12/069; H04W 24/10; H04W 64/00
See application file for complete search history.

(56) References Cited

U.S. PATENT DOCUMENTS 8,830,053 B2 9/2014 Benson et al.
9,379,894 B1 * 6/2016 Luo .......................... H04L 9/321
(Continued)

OTHER PUBLICATIONS

N5 Asset Monitor, (Web Page), Retrieved Jun. 3, 2019, 7 Pgs.
(Continued)

*Primary Examiner* — Chris Parry
*Assistant Examiner* — Hassan A Khan
(74) *Attorney, Agent, or Firm* — Sheppard Mullin Richter & Hampton LLP

(57) ABSTRACT

Systems and methods are provided for providing supplemental information or data to location-based data provided by conventional asset tags. In particular, sensors such as environmentally-aware sensors, Internet of Things (IoT) sensors, and the like may be incorporated into asset tag devices. In turn, these enhanced asset tags may be integrated into network devices, such as access points, network switches, etc. Accordingly, network devices can be leveraged to provide location-based information, in addition to other information, such as environmental operating conditions relative to the location of such network devices. Moreover, secure communication links can be created between the enhanced asset tags, network devices, and controlling entities in the network, such as network management servers through a mutual authentication mechanism.

15 Claims, 7 Drawing Sheets

(51) Int. Cl.
*H04L 61/5014* (2022.01)
*H04L 101/618* (2022.01)

(56) References Cited

U.S. PATENT DOCUMENTS

| | | | | |
|---|---|---|---|---|
| 9,571,164 | B1* | 2/2017 | Luo | H04B 5/0056 |
| 10,198,709 | B2 | 2/2019 | Brignone et al. | |
| 10,360,421 | B1* | 7/2019 | Farrell | H04B 5/0062 |
| 10,890,986 | B2* | 1/2021 | Kake | G06K 7/10376 |
| 11,347,205 | B2* | 5/2022 | Celia | B62D 15/0215 |
| 2007/0250410 | A1* | 10/2007 | Brignone | G06Q 10/087 705/28 |
| 2009/0126001 | A1* | 5/2009 | Krantz | G06F 21/33 726/10 |
| 2010/0161969 | A1* | 6/2010 | Grebovich | H04L 9/3247 713/176 |
| 2013/0120135 | A1* | 5/2013 | Benson | G08B 13/22 340/506 |
| 2014/0101439 | A1* | 4/2014 | Pettigrew | H04L 9/3268 726/7 |
| 2014/0266669 | A1* | 9/2014 | Fadell | G08B 27/003 340/501 |
| 2015/0067793 | A1* | 3/2015 | Robison, Jr. | H04L 63/083 726/5 |
| 2015/0112885 | A1* | 4/2015 | Fadell | G08B 29/185 705/330 |
| 2016/0066137 | A1* | 3/2016 | Kulkarni | H04W 4/02 455/456.1 |
| 2016/0094994 | A1* | 3/2016 | Kirkby | G11B 27/031 380/270 |
| 2016/0234099 | A1* | 8/2016 | Jiao | H04L 47/2441 |
| 2016/0373418 | A1* | 12/2016 | Ståhl | G06F 21/44 |
| 2017/0033889 | A1* | 2/2017 | Ma | H04L 69/168 |
| 2017/0041231 | A1* | 2/2017 | Seed | H04L 67/14 |
| 2017/0063566 | A1* | 3/2017 | Seminario | H04L 67/12 |
| 2017/0118187 | A1* | 4/2017 | El Khoury | H04L 63/1408 |
| 2017/0272316 | A1* | 9/2017 | Johnson | H04L 61/301 |
| 2017/0279620 | A1* | 9/2017 | Kravitz | H04L 63/0876 |
| 2017/0345019 | A1* | 11/2017 | Radocchia | G06Q 10/0833 |
| 2018/0054490 | A1* | 2/2018 | Wadhwa | G08G 1/0129 |
| 2018/0123888 | A1* | 5/2018 | Andrews | H04L 41/0846 |
| 2018/0131765 | A1* | 5/2018 | Puleston | H04L 67/1097 |
| 2018/0293551 | A1* | 10/2018 | Buca | G06Q 10/0833 |
| 2019/0044737 | A1* | 2/2019 | Singhi | H04L 9/0825 |
| 2019/0109848 | A1* | 4/2019 | Clark | H04L 9/3228 |
| 2019/0166013 | A1* | 5/2019 | Shaikh | H04L 41/20 |
| 2020/0275273 | A1* | 8/2020 | Smith | H04W 12/50 |
| 2021/0067506 | A1* | 3/2021 | Ideguchi | H04L 63/0823 |
| 2021/0184842 | A1* | 6/2021 | Nix | H04L 9/3263 |
| 2021/0216060 | A1* | 7/2021 | Moeller | H04L 67/10 |

OTHER PUBLICATIONS

Overview of Internet of Things, (Web Page), Retrieved May 24, 2019, 18 Pgs., Google Cloud.

Aruba, "Aruba Asset Tracking", available online at <https://web.archive.org/web/20190208233904/https://www.arubanetworks.com/assets/so/SO_AssetTracking.pdf>, Feb. 8, 2019, 2 pages.

Aruba, "Aruba Delivers First Asset Tracking Solution Fully Integrated into WLAN Infrastructure to Improve Staff Efficiency and Customer Experience while Controlling Costs", available online at <https://news.arubanetworks.com/press-release/aruba-delivers-first-asset-tracking-solution-fully-integrated-wlan-infrastructure-impr>, Jun. 5, 2017, 5 pages.

Health IT Outcomes, "Datasheet: AssetGather: RFID and Sensor-Based Asset Tracking Solution", available online at <https://www.healthitoutcomes.com/doc/assetgather-rfid-and-senosr-based-asset-0001>, Oct. 8, 2009, 2 pages.

HPE, "Aruba Meridian Services", Rev. 4, available online at <https://h20195.www2.hpe.com/V2/getpdf.aspx/4AA6-6322ENW.pdfver=1.0>, Oct. 2019, 7 pages.

Kim et al., "Wireless Sensor Network based Asset Tracking Service", PICMET 2008 Proceedings, Jul. 27-31, 2008, pp. 2643-2647.

Zhu et al., "IOT Gateway: Bridging Wireless Sensor Networks into Internet of Things", 2010 IEEE/IFIP International Conference on Embedded and Ubiquitous Computing, 2010, pp. 347-352.

\* cited by examiner

NETWORK DEVICE-INTEGRATED ASSET TAG-BASED ENVIRONMENTAL SENSING WITH MUTUAL AUTHENTICATION

DESCRIPTION OF RELATED ART

Asset inventory and management are key aspects of any business or operation, and can present various challenges. Conventional systems and methods of asset inventory and management are limited to determining the location of assets. Other solutions may provide environmental feedback, but through the use of separate, non-integrated products. In many scenarios, critical information regarding assets is left "unconsidered," i.e., the environmental conditions that may impact the operation of those assets, the system in which the assets operate, user access to those assets, etc.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
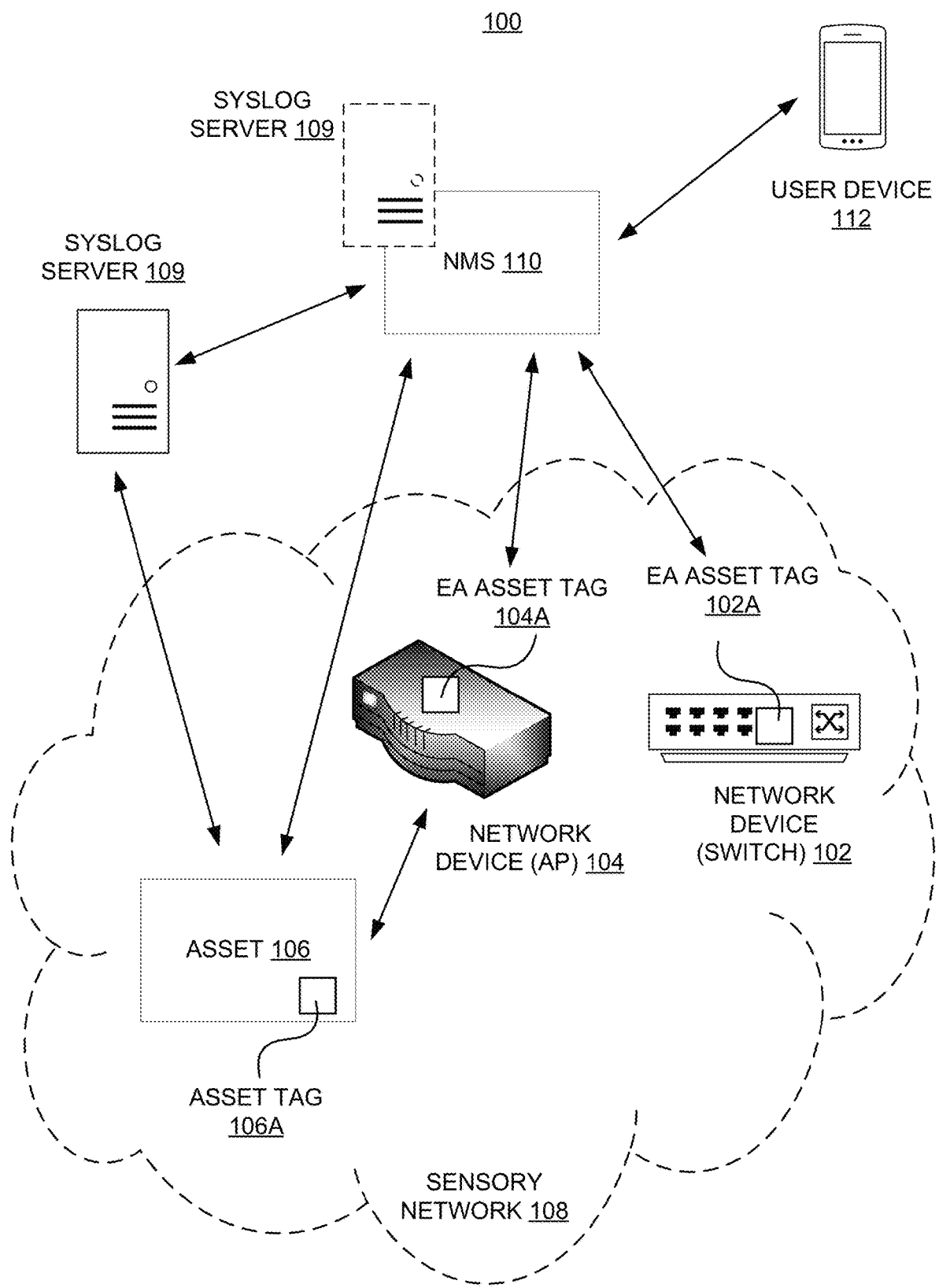
FIG. 1A illustrates an example network in which network device-integrated asset tag-based environmental sensing with mutual authentication can be implemented in accordance with one embodiment.

The figures are not exhaustive and do not limit the present disclosure to the precise form disclosed.

DETAILED DESCRIPTION

An enterprise, such as a business, an organization, or an individual, may utilize various assets in conducting enterprise operations. For example, assets can include information technology, industrial equipment, laboratory systems, office equipment, and a variety of other items used for enterprise operations. In some cases, an asset is used for multiple different projects, in multiple different cost centers, by multiple different users. A physical location, status, and/or other attributes of an asset may change one or more times before the asset is retired.

In some cases, an enterprise uses or obtains assets based on a particular request for a good or service provided by the enterprise. For example, a client may request a particular good or service provided by the enterprise, and the enterprise may purchase and/or use one or more assets to provide the particular good or service requested by the client. Thus, as alluded to above, asset inventory and management are key considerations for most if not all enterprises.

An unaddressed challenge affecting asset inventory and management is safeguarding the assets and/or the enterprise itself in light of changing environmental conditions. For example, the operation of certain assets, such as data center equipment, hospital instruments, etc. may be impacted by the presence of excessive dust, by water leakage, and/or other environmental conditions.

Accordingly, various embodiments are directed to systems and methods of integrating environmental sensors in/with asset tags, which in turn, are integrated into network devices. For example, Internet of Things (IoT) sensors, such as sensors capable of sensing temperature, water, dust, etc. are included in an asset tag, and that asset tag is in turn embedded within a network device, such as a switch, an access point (AP), an instant AP (IAP), and the like. Such environmentally aware (EA) asset tags may be embedded in areas/sections/portions of network devices having exposure to a network device's internal operating environment as well as the environment external to the network devices, such as fan blades, housings/enclosures, etc. Thus, the EA asset tags sense environmental conditions, while also providing location-based information that can be associated with the sensed environmental conditions. The location-based information and the sensed environmental conditions can be transmitted to a network management server (also referred to as an NMS). A user, such as a network administrator, enterprise personnel, or anyone having an interest in such information can then access or be provided with this information by accessing the NMS and/or via a remote computing device, e.g., mobile device, such as a smart phone, tablet PC, or laptop operatively connected to the NMS. In some embodiments, EA asset tags may be embedded directly on an application-specific integrated circuit (ASIC) of a network device.

In this way, environmental information regarding a particular location (relative to the network device) can be ascertained and associated with location information obtained from the asset tag. Moreover, there is no need to "pepper" a system or environment with myriad IoT sensors, relying instead on, e.g., existing network devices with the embedded IoT sensors/asset tags to provide the requisite data. It should be understood that asset tags can be enhanced through incorporating other types of sensors or data gathering mechanisms in accordance with still other embodiments.

Additionally, various embodiments are directed to a secure method of exchanging data between the environmentally aware asset tags and an NMS which involves a mutual authentication process to ensure data is transmitted between trusted entities. Moreover, because some network devices can implement "zero-touch provisioning," a user need not perform any manual operations to enable environmental monitoring in a network device with embedded IoT sensors/asset tags. Further still, a user may have control over the collection parameters, e.g., frequency of data collection, collection durations, notification thresholds (for scenarios where users may wish to be informed of environmental conditions that, e.g., exceed a set threshold). In some embodiments, each environmental sensor may have an interface through which the user may specify one or more of the aforementioned parameters. In some embodiments, and when an EA asset tag is implemented directly onto an ASIC of a network device, the user may configure or adjust operation of the environmental sensor via a user interface of the network device.

It is useful to describe a network or system within which the aforementioned EA asset tags may be implemented in various applications. FIG. 1A illustrates one example of a network 100 that may be implemented for an enterprise or an organization, such as a business, educational institution, governmental entity, healthcare facility, or other enterprise/organization. It should be understood that the number, type, configuration, implementation, etc. represented in FIG. 1A (and described in accordance with one or more embodiments herein) are merely examples, and not meant to be limiting in any way. In the illustrated example, various network devices, e.g., network device 102 (a switch) and network device 104 (an access point (AP)) may have one or more of the aforementioned EA asset tags integrated therein. For example, network device 104 may have integrated therein, an EA asset tag 104A, and network device 102 may have integrated therein, an EA asset tag 102A. It should be noted that although switches and APs are provided as examples herein, EA asset tags may be implemented in any network device, component, or other like element of a network. Additionally, network 100 may include an enterprise asset 106 on which a conventional asset tag 106A is attached or located.

It should be understood that network 100 may comprise any infrastructure or combination of infrastructures that enable electronic communication between the components therein. For example, network 100 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Each of EA asset tags 102A and 104A, and asset tag 106A may communicate information to NMS 110. The information communicated to NMS 110 may include, but is not limited to environmental information representative of environmental conditions at or near network devices 102 and 104, as well as location information pertinent to the location of network devices 102 and 104. Asset tag 106A, being a conventional asset tag, may transmit location information to NMS 110 or to one or more network devices capable of receiving such information, e.g., network device 104. Together, EA asset tags 102A, 104A, and conventional asset tag 106A may form a sensory network 108.

It should be noted that in some embodiments, NMS 110 may include a syslog server 109 for receiving captured syslog messages (described in greater detail below) representative of collected data from sensory network 108. In other embodiments, as also reflected in FIG. 1A, syslog server 109 may reside external to NMS 110 and sensory network 108.

In the illustrated example, a user device 112, e.g., a smart phone, may be used by enterprise personnel, such as an administrator, to access and view the information transmitted from one or more of EA asset tags 102A, 104A, and conventional asset tag 106A. It should be understood that user device 112, or other computing devices (not illustrated) receiving information from one or more of EA asset tags 102A, 104A, and/or asset tag 106A may be any type of computing device providing a user interface through which a user can interact with a software application. For example, a user device may include a laptop computing device, a desktop computing device, an all-in-one computing device, a thin client, a workstation, a tablet computing device, a mobile phone, an electronic book reader, a network-enabled appliance such as a "Smart" television, and/or other electronic device suitable for displaying a user interface and processing user interactions with the displayed interface.

User device 112 may be running asset management software, asset analytics software, map/location software, asset tag (conventional and EA asset tag) and beacon management software, etc. Flexible application programming interfaces (APIs), e.g., REST APIs, and software development kits (SDKs) can be provided to send asset tag/EA asset tag information to the desired management, analytics, and/or other software, as well as allow a user to control operation of an asset tag and/or EA asset tag/environmental sensor. It should be understood that such software may provide graphical representations of the asset tag/EA asset tag information, or in some embodiments, NMS 110 may process, organize, and/or otherwise analyze the collected asset tag/EA asset tag information for presentation on user device 112. In some embodiments, location information can be accurate to approximately 10 feet about the asset or network device to which an asset tag/EA asset tag is connected or integrated. In some embodiments network devices may be deployed every 50 feet to provide desired coverage.

For example, EA asset tag 104A may comprise one or more of a temperature sensor and an air quality or particulate sensor that senses temperature, dust, water droplets, and the like at or about network device 104A. The range or area monitored by EA asset tag 104A may depend on the particular configuration/capabilities of the integrated sensors, which can vary. EA asset tag 104A may also communicate location information regarding network device 104 via, e.g., Bluetooth Low Energy (BLE) to network device 104 in which it is integrated (network device 104 being BLE-enabled). As alluded to above, in some embodiments, an EA asset tag, such as EA asset tag 104A may be integrated or implemented on the ASIC of network device 104, allowing network device 104 direct access to the information sensed/gathered by EA asset tag 104A. That is, EA asset tag 104A need not communicate its information over BLE or other wireless technology. It should be understood that if embedded on the ASIC, EA asset tag 104 can draw power from the ASIC and main power source of network device 104. Regardless, wherever an EA asset tag is implemented, it may draw minimal power from a power source associated with the device, component, etc. on which it is implemented.

NMS 110 may be a server computing device that monitors the health and performance of a network and/or configures devices connected thereto, such as network devices 102 and 104. NMS 110 may further manage and/or deploy a network, such as network 100. Examples of NMS include Aruba® Central™, and Aruba® Airwave™. The connection between NMS Server 110 and network devices 102, 104, the respective EA asset tags 102A, 104A, and asset tag 106A may include one or more network segments, transmission technologies, and/or components. In one embodiment, network device 102 (a switch) may be configured to process and transfer data in network 100. In one embodiment, network device 104 (an AP) may be configured to allow devices, such as user device 112 (or other client devices, not illustrated) to wirelessly connect to a wired network using, e.g., IEEE 802.11 or other standard(s). Network 104 may connect to a router via a wired network (not shown) ban can also be an integral component or element of the router itself. It should be noted that instead of or in addition to NMS 110, EA asset tags 102A, 104A, and conventional asset tag 106A may communicate their respective information to another server computing device, such as a Dynamic Host Configuration Protocol (DHCP) server, an authentication server, a security policy management server, or other similar network server. Alternatively, EA asset tags 102A, 104A, and conventional asset tag 106A may communicate their respective information to a cloud server, cloud computing device, edge computing device, etc.

Any number and/or combination of network devices, EA asset tags, and conventional asset tags may make up a sensory network, such as sensory network 108. In some embodiments, the aforementioned software running on user device 112, e.g., analytics software and/or any asset or network device management function(s) executing on NMS 110 may leverage location information from conventional asset tag 106A in conjunction with EA asset tag environmental and location information. For example, if asset 106 is proximate enough to network device 104 (determined based on location information obtained from both conventional asset tag 106A and EA asset tag 104A), any environmental information, e.g., dust concentration, sensed by EA asset tag 104A may be imputed to the location of asset 106. Therefore, environmental considerations regarding or impacting the operation of asset 106, for example, can be determined using information derived by EA asset tag 104A.

Figure 1B:
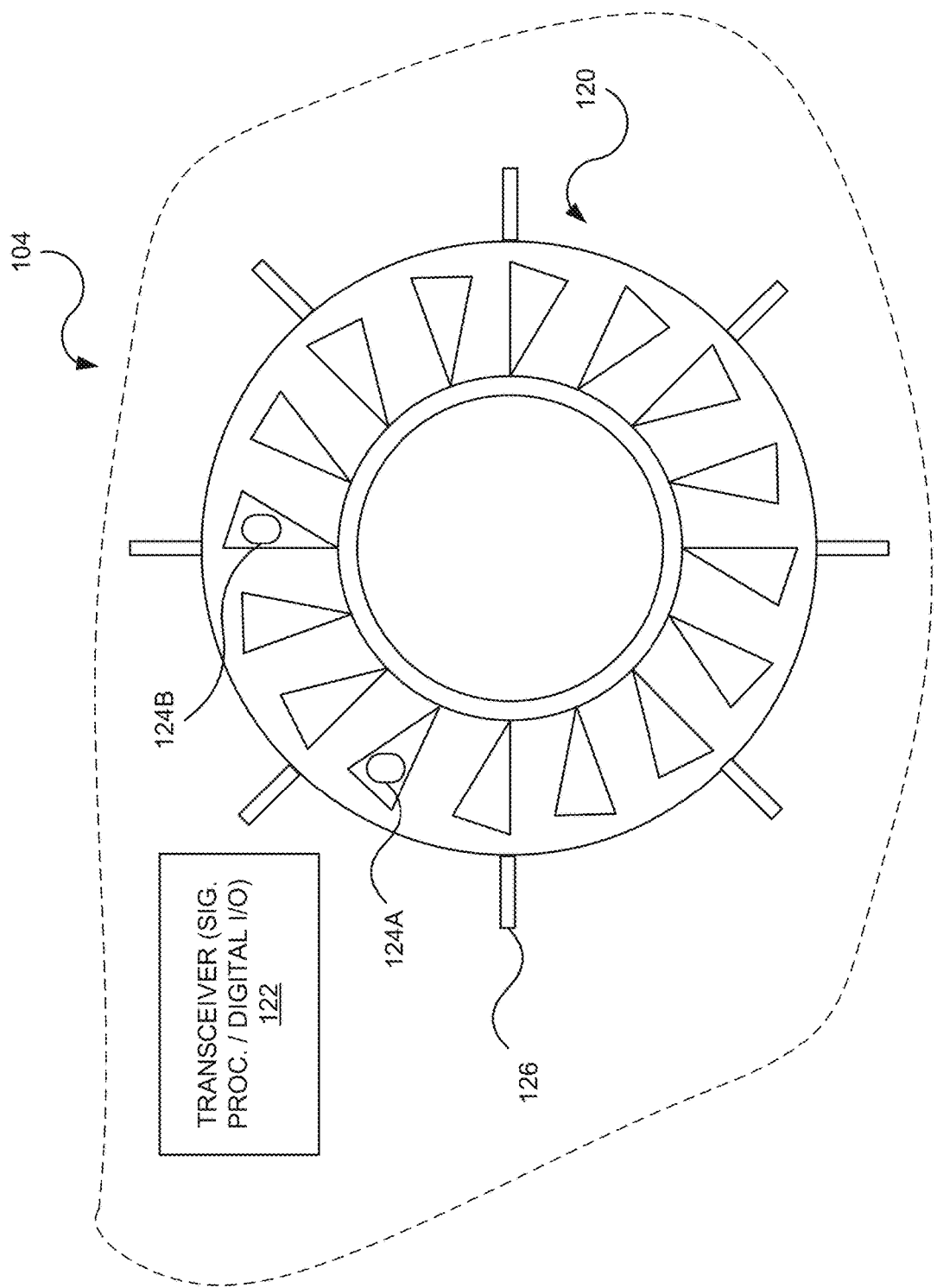
FIG. 1B illustrates an example implementation of an environmentally aware asset tag in a network device in accordance with one embodiment.

FIG. 1B illustrates a cutaway view of a network device, e.g., network device 104, which may be a wireless AP. Integrated into network device 104 are EA asset tags 124A and 124B that may be located on/near the fan unit 120 of network device 104, e.g., on one or more fan blades of a fan motor. Each of EA asset tags 124A and 124B may comprise a sensor, such as a thermocouple capable of measuring temperature and asset tag functionality for providing location-based information. Each of EA asset tags 124A and 124B may then transmit their respective temperature information to transceiver 122.

It should be noted that location of EA asset tags relative to the fan unit 120 of network device 104 may be purposeful in that a fan/fan enclosure generally straddles the interior and exterior of a device. Accordingly, locating EA asset tags 124A and 124B on or near the fan unit 120 of network device 104 allows temperature information regarding the interior operating conditions of network device 104. Additionally, the exterior conditions at or about network device 104 can also be sensed. For example, as network device 104 processes more packets (per ASIC throughput), more heat can be generated. Placement of EA asset tags 124A and 124B on/near the fan unit 120 can be useful in determining such operating conditions. In some examples, motion or dust sensors instead of or in addition to wireless temperature sensors may be implemented into EA asset tags 124A and 124B inasmuch as increased fan rotation (that can be sensed by such motion sensors) can be used to infer high heat operating conditions (external and internal to network device 104). It should be understood, however, that locating or orienting sensors relative to the fan is only an example, and sensors can be integrated in other areas of a network device.

Transceiver 122 may then transmit the temperature information received from EA asset tags 124A and 124B to NMS 110 (FIG. 1). Transceiver 122 may broadcast this information using radio frequency (RF) signals such as 2.4 GHz RF signals, which in some embodiments, may be broadcast regularly, such as every five minutes (although transceiver 122 can be configured to transmit at any desired radio frequency, at any desired broadcast frequency (regular or aperiodic). Transceiver 122 can be configured for very low current consumption, e.g., transceiver 122 may include a low-power microprocessor and a 2.4 GHz RF module so it is able to perform for long periods of time, e.g., over a year, on a single charge using, e.g., power over ethernet (PoE). Transceiver 122 can be configured to transmit over various distances as desired, with less or greater strength (to account for any physical barriers, e.g., walls). Each of EA asset tags 124A and 124B may be configured with a unique identifier in order to allow identification and association of EA asset tags, and/or conventional asset tags with locations and monitored information, assets, and/or network devices. For example, in one embodiment, EA asset tag 124A may be, as described above, a sensor asset tag configured to provide temperature information, while EA asset tag 124B may be, as also described above, a sensor asset tag configured to provide information regarding dust. By associating each EA asset tag with a unique identifier, a user can specify specific types of data to collect, and those specific types of data can be provided. That is, in one scenario, a user may request temperature information from network device 104, in which case, transceiver 122 may communicate temperature data obtained by EA asset tag 124A without involving EA asset tag 124B. For example, a request for data from EA asset tag 124A may be received at network device 104. In some embodiments, transceiver 122 (which may also include signal processing and digital input/output (I/O) components) may cache data received from both EA asset tags 124A and 124B. Upon receiving a request for data provided by EA asset tag 124A, transceiver 122 may pull or obtain data associated with the unique identifier of EA asset tag 124A.

EA Asset tag 140A may further comprise a low-power microprocessor, e.g., an ARM-based PXA255 core running embedded Linux, along with requisite one or more RF modules and antennas (for communicating with, e.g., transceiver 122), an ethernet controller, and location engine.

In some embodiments, information collection by one or more EA asset tags can begin upon bootup of a network device in which the one or more EA asset tags are integrated. In some embodiments, network devices such as those contemplated herein may leverage zero-touch provisioning technology (an example of which is disclosed in Applicant's U.S. patent application Ser. No. 15/138,664, the contents of which are incorporated herein by reference). That is, a "new" network device, e.g., network device 104 may be automatically added to an enterprise's inventory in a cloud-based service, such as Aruba® Activate™ for example, and can be associated with proper provisioning rules for that enterprise. Such an association may be accomplished by placing device information for that particular network device into a folder associated with a desired set of rules to be followed. The network device in a first operating (non-provisioned) state is then factory-shipped to a targeted destination, where a user, e.g., administrator takes the network device out of the box and an event occurs (e.g., power-up and connection to a network; connection to a network; time-based in which a prescribed amount of time has elapsed; or return back to the first operating state). In a "non-provisioned state," the network device has no configuration settings and has no knowledge of a network device that is operating as its configuration device (e.g., NMS 110 such as AirWave® or a controller such as ARUBA® 6000, 7200 or 3x000 controllers). In another operating (provisioned) state, the network device is provided with rules that define how the network device may contact its configuration device to retrieve information, such as firmware and configuration settings and in what configuration group the network device belongs. Furthermore, the rules may be used to automatically assign the network device to specific geographical locations.

Upon connection, the network device in the non-provisioned state retrieves its provisioning information from the cloud-based service, and then uses that information to obtain its configuration information from another network device operating as a configuration device, in this example, NMS 110. Depending on the mode of operation, such as where the network device is operating as a virtual control device, the network device may then push that configuration out to one or more other subordinate network devices in the wireless local area network (WLAN), e.g., network device 102 of network 100.

Upon becoming provisioned and entering an operative state, the EA asset tags integrated into a network device, e.g., network device 104, may also be enabled to begin collecting data. That is, EA asset tags may begin receiving power from the network device in which in they are integrated, and can automatically begin capturing data. If for some reason, a user wishes to alter operation of an EA asset tag, each halt data collection, configure parameters associated with the EA asset tag, etc., the user can control operation of the EA asset tag using command line interface instructions via the network device console, via the NMS, etc. In this way, the sensor network 108 can begin collecting data and transmitting that data to NMS 110, user device 112, etc. without the need for manual user intervention or configuration. It should be understood that in some embodiments, as discussed above, the EA asset tag (with its environmentally aware sensors) can be integrated directly onto the ASIC of a network device. In this way, the data collected by the EA asset tag, e.g., the environmental data captured by the environmentally aware sensors, can be accessed directly by the network device, and in turn by a user, e.g., via a console of or associated with the network device. Alternatively, the network device can directly receive the environmental data and the network device can transmit the information directly to an associated NMS or other network device.

Figure 2:
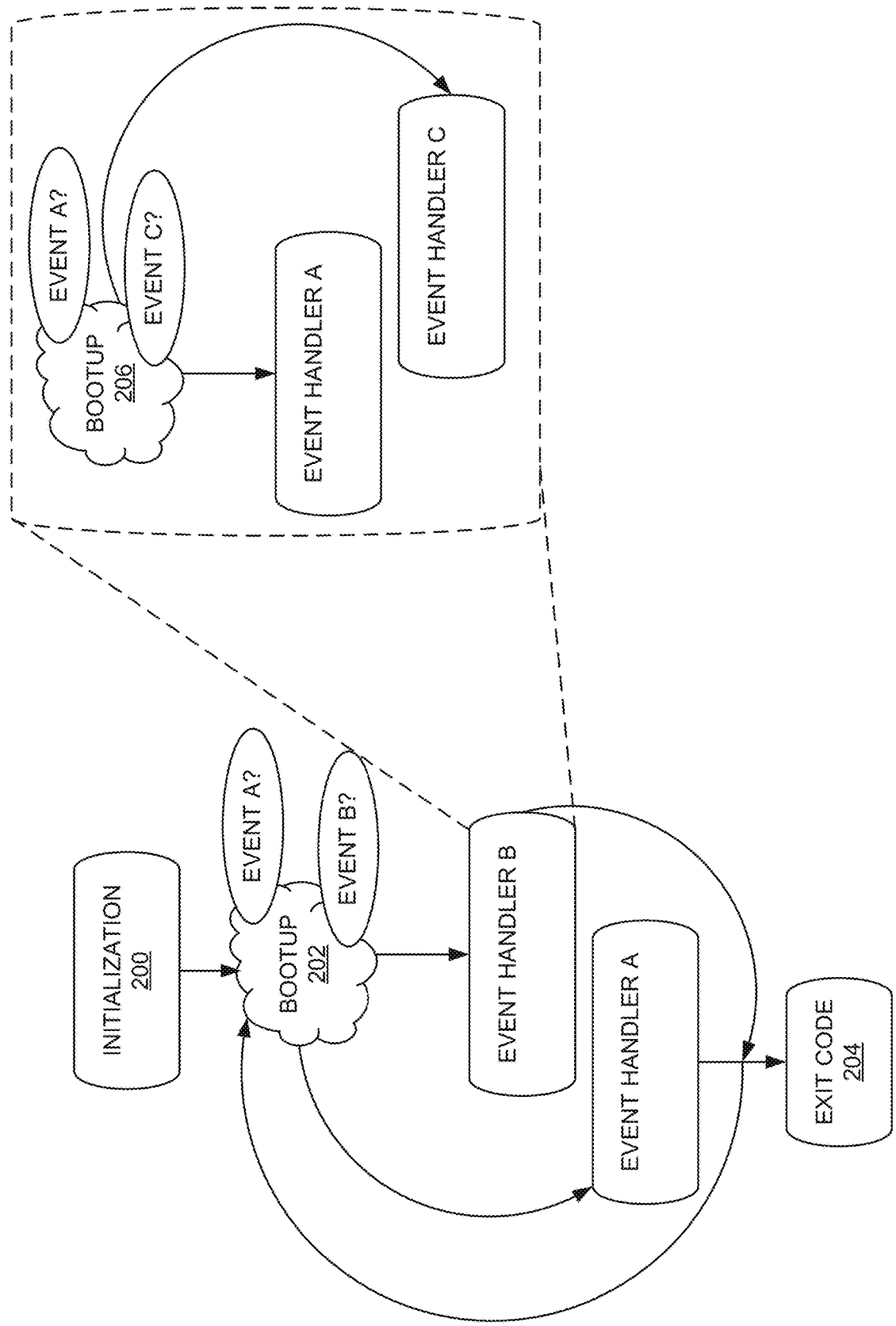
FIG. 2 illustrates an event handling process that may be performed as part of mutual authentication in accordance with various embodiments.

FIG. 2 illustrates an example provisioning scenario in accordance with one embodiment. At 200, an initialization process executes to begin a bootup process at 202. That is, when network device 104 is powered on, network device 104 performs an internal operational check. For example, network device 104 may determine whether its component parts are operational, e.g., whether the ASIC is operational/operating correctly, whether the battery is providing the requisite power (or is charged and ready to provide backup power if needed), etc. It should be noted that, as described above, network device performs various operations to obtain its network configuration. In some embodiments, network device 104 may connect to a dynamic host configuration protocol (DHCP) server, to obtain the Internet Protocol (IP) address of the NMS to which it will associate, in this case, NMS 110. During the bootup process at 202, network device 104 may engage in mutual authentication with NMS 110 (described in greater detail below). As part of this bootup process 202, network device 104 may generate one or more events, e.g., event A, event B, event C, etc., in response to some failure, such as suspicion of fraud (e.g., spoofing), receipt of an untrusted certificate (expired, unvalidated, etc.) and the like. Accordingly, network device 104 may wait for one or more events to occur. In response, and remedy such failure events, corresponding event handlers may execute, e.g., event handlers A, B, or C. That is, an event can be tied to the definition of an event handler, that according to a current state of network device 104, may perform some processing (e.g., to remedy the event), create new events, and/or alter the current state of network device 104. Upon remedying any failure events, network device 104 may exit the initialization process at 204. In the example illustrated in FIG. 2, event handler B may require validating certain events, e.g., events A and C, which in one embodiment may corresponding to validating data collection and transmission operations. In some embodiments, a restart of the EA asset tag may be warranted, e.g., subsequent to event handling per event handling A, FIG. 2 illustrates returning to the bootup phase. Once mutual authentication between network device 104 and NMS 110 occurs, the EA asset tags of network device 104 may commence data collection and/or transmission.

Figure 3:
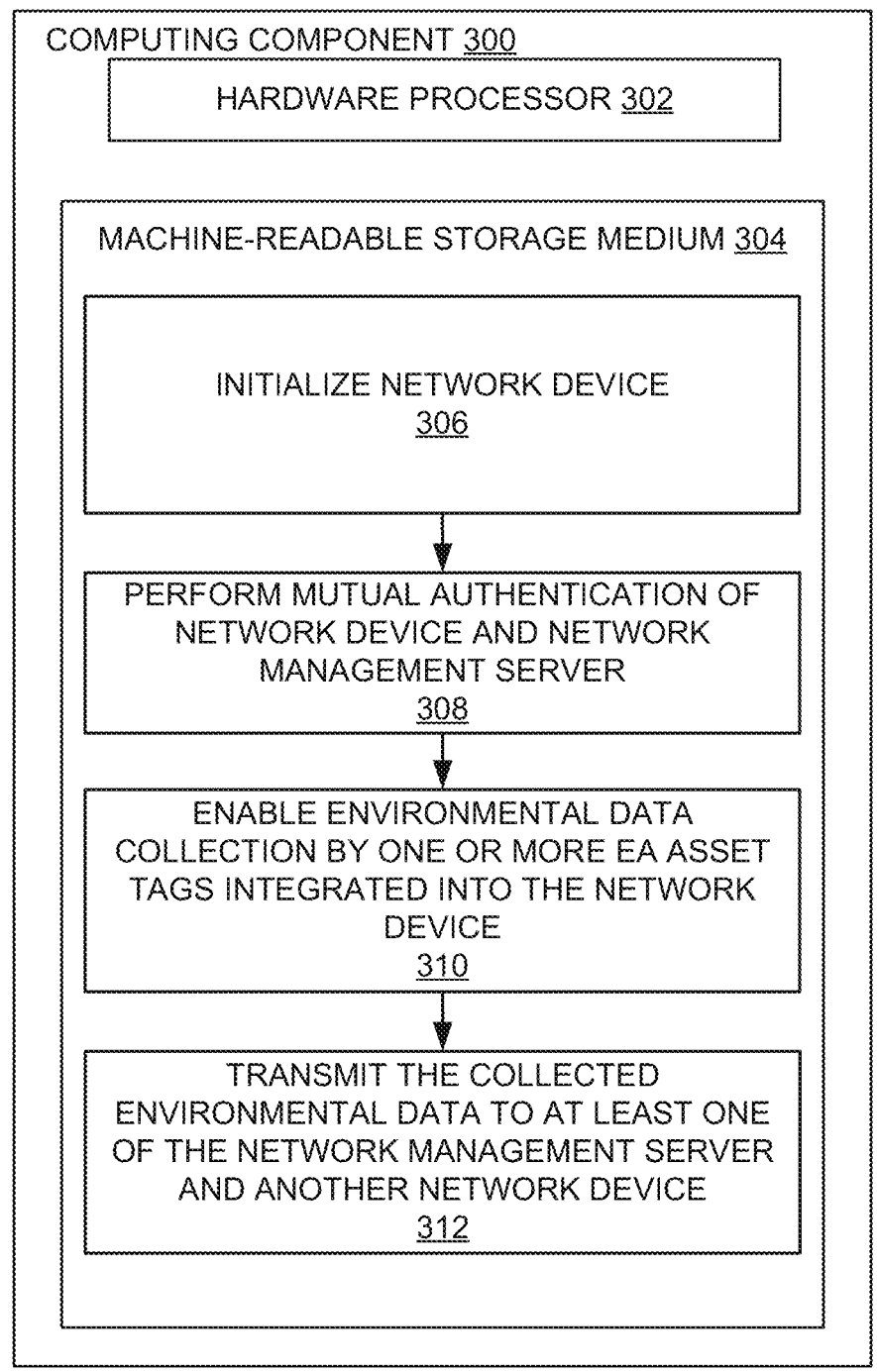
FIG. 3 is a block diagram of an example computing component for performing mutual authentication and environmental data collection and transmission in accordance with one embodiment.

FIG. 3 is a block diagram of an example computing component or device 300 for collecting environmental data proximate to the network device, which may be transmitted along with associated location information in accordance with one embodiment. In the example implementation of FIG. 3, the computing component 300 includes a hardware processor 302, and machine-readable storage medium 304. In some embodiments, computing component 300 may be an embodiment of a network device in which one or more EA asset tags are integrated, such as network device 102 or 104 of FIG. 1A.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 306-312, to control processes or operations for mutually authenticating device 300 with a corresponding NMS or similar server/network element, and collecting/transmitting environmental and location data. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-312. Depending on the implementation, the instructions may include additional, fewer, or alternative instructions, and may be performed in various orders or in parallel.

Hardware processor 302 may execute instruction 306 to initialize itself (a network device). As noted above, initialization may trigger a bootup process that includes checking the component parts of the network device to ensure they are operating properly, e.g., the ASIC is operational, the battery is operational, the transceiver (RF and/or BLE) is operational, etc.

Hardware processor 302 may execute instruction 308 to perform mutual authentication of the network device and an associated NMS. Mutual authentication can involve the exchange of certificates, authentication of certificates, etc., subsequent to contacting a DHCP server and obtaining the IP address of the NMS, from which an appropriate network configuration can be obtained.

Hardware processor 302 may execute instruction 310 to enable environmental data collection by one or more EA asset tags integrated into the network device. As described above, the one or more EA asset tags may comprise one or more environmentally aware sensors, such as temperature sensors, particulate sensors, and the like for capturing data regarding the environmental conditions at or around the network device.

Hardware processor 312 may execute instruction 312 to transmit the collected environmental data to the NMS. Additionally, the one or more EA asset tags may transmit location information indicative of the location of the network device in which the one or more asset tags are integrated. In this way, the location information obtained from conventional, non-environmentally aware asset tags can be supplemented with environmental data that the NMS, a user, or other management/controlling network element can use to facilitate or improve operation of the enterprise as a whole. For example, certain equipment in a data center environment may be negatively impacted by excessive dust or excessive heat (either from an external source/condition or from internal operating conditions). The EA asset tags disclosed herein can provide environmental data in addition to location data that may allow a data center administrator to determine areas of the data center that may require better air filtration, and the requisite extent of that improved air filtration.

Figure 4:
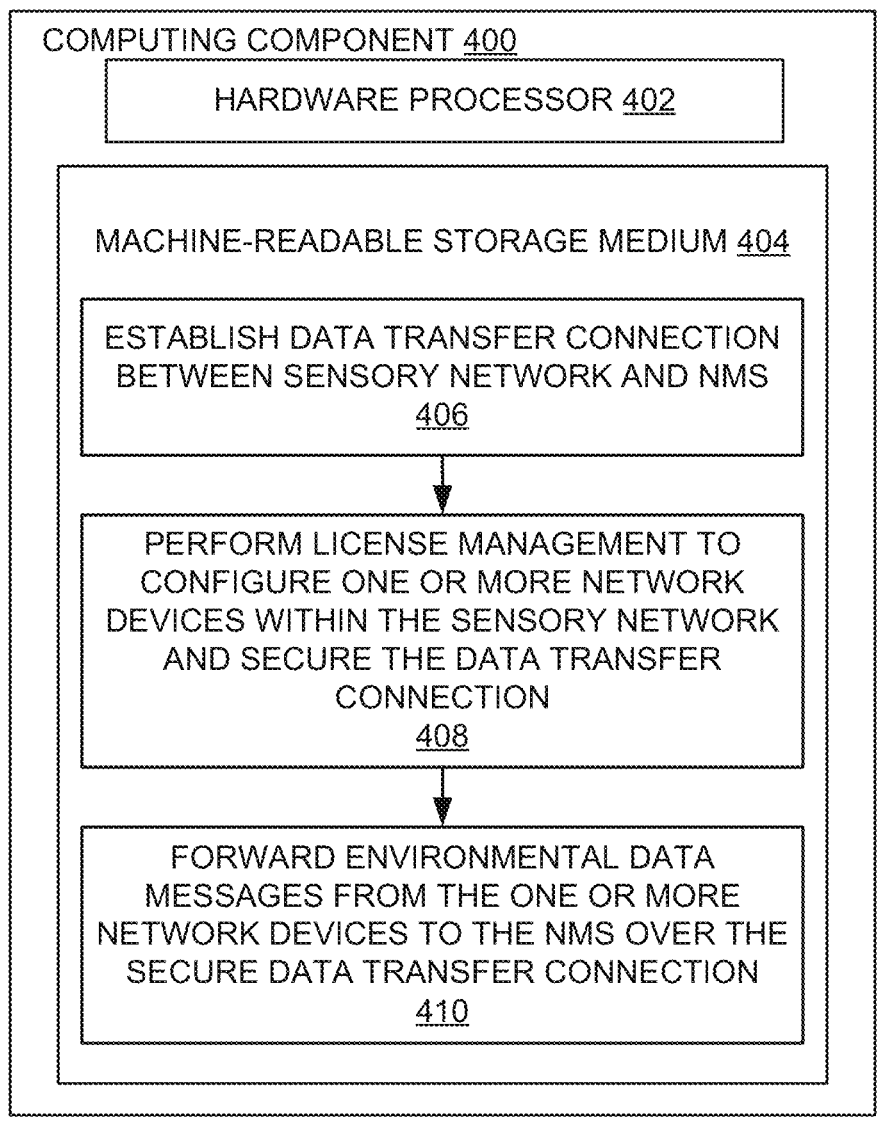
FIG. 4 is a block diagram of an example computing component for establishing a secure connection for data transmission of environmental data messages in accordance with one embodiment.

As alluded to above, data transfer (e.g., sensor/location information exchange between EA asset tags, conventional asset tags, network devices, and NMSs or similar computing devices) in accordance with various embodiments is performed in a secure manner. FIG. 4 is a block diagram of an example computing component or device 400 for implementing mutual authentication and establishing secure data transfer in accordance with one embodiment. In the example implementation of FIG. 4, the computing component 400 includes a hardware processor 402, and machine-readable storage medium 404. In some embodiments, computing component 400 may be an embodiment of an NMS, such as NMS 110, or it may be an embodiment of a syslog server, e.g., syslog server 109.

Hardware processor 402 may be one or more central processing units (CPUs), semiconductor-based microprocessors, and/or other hardware devices suitable for retrieval and execution of instructions stored in machine-readable storage medium, 404. Hardware processor 302 may fetch, decode, and execute instructions, such as instructions 406-410, to control mutual authentication and establishment of secure data transfer. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-410. Depending on the implementation, the instructions may include additional, fewer, or alternative instructions, and may be performed in various orders or in parallel.

Figure 5:
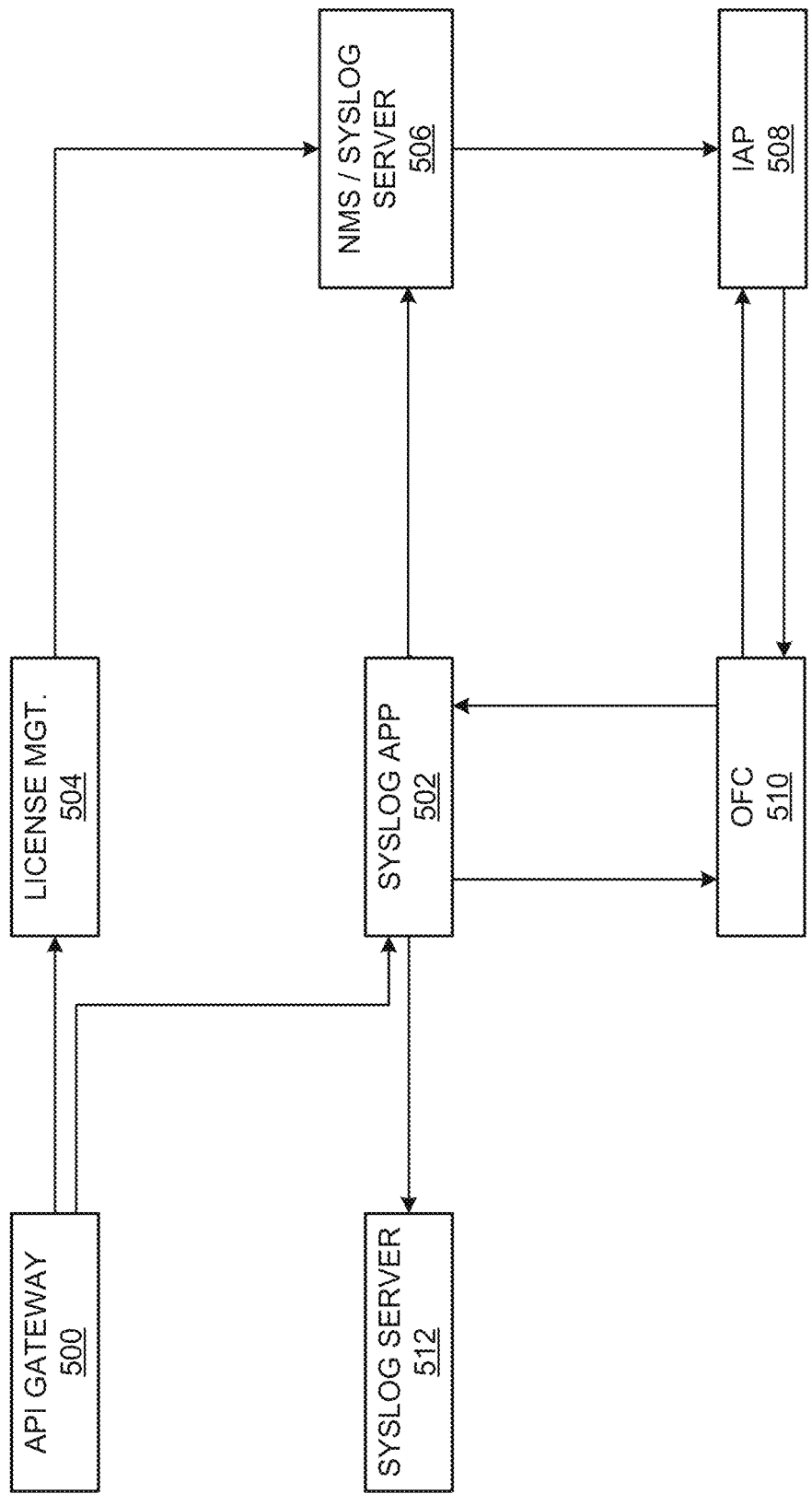
FIG. 5 illustrates an example mutual authentication architecture in accordance with one embodiment.

FIG. 4 will be described in conjunction with FIG. 5, an example system architecture for the secure transmission of EA asset tag-generated data in accordance with various embodiments. In some embodiments, environmental sensors, such as an optical sensor, for example, may be integrated with a simple network management protocol (SNMP) daemons and API processes (e.g., REST API processes) in order to collect requested information, e.g., monitored data/values.

Referring to FIG. 4, hardware processor 402 may execute instruction 406 to establish a data transfer connection between a sensory network and an NMS. That is, by way of an API gateway 500, a user, such as an enterprise administrator may register any syslog servers, e.g., syslog server 512, with an NMS 506, which may be an embodiment of NMS 110. Syslog server 512 may receive and collect syslog messages from network devices, such as an instant AP (IAP) 508. It should be understood, as noted above with respect to FIG. 1A, a syslog server can be part of an NMS. Accordingly, in some embodiments, rather than a separate syslog server 512, the operations described herein can occur at/within NMS 506. IAP 508 which may be an embodiment of network device 104 (that in conjunction with other network devices and/or conventional asset tags, such as network device 102 and asset tag 106 can make up a sensory network, e.g., sensory network 108). Syslog messages can include identifying information regarding where, when, and/or why a log was sent, such as IP address information, timestamp information, and an actual log message, in this case, monitored environmental data. Additionally, a syslog app 502 may establish a connection with syslog server 512.

Hardware processor 402 may execute instruction 408 to perform license management to configure one or more network devices within the sensory network and secure the data transfer connection. In one embodiment, the user may assign a syslog license to IAP 508. It should be understood that NMS 506 can provide an API that may be used to configure the syslog servers to be listened to, and from which syslog messages can be received. A license management component 504 may notify a configuration device (which may be configuration software or a configuration engine running on NMS 506) of the syslog license assignment. The NMS 506 may then push an OpenFlow configuration to IAP 508, and IAP 508 can establish an OpenFlow connection with an OpenFlow controller 510 over/on NMS 506. It should be understood that OpenFlow refers to an open communications interface between the control plane and forwarding layers of a network, e.g., network 100. IAP 508 makes wireless clients, in this case, EA asset tags integrated in IAP 508 connected to an OpenFlow-enabled port appear on OpenFlow controller 510 after checking licenses/certificates. Ultimately, OpenFlow allows NMS 506 the ability to communicate with a network device such as IAP 508, a switch (e.g., network device 102 of FIG. 1A), etc.

Hardware processor 402 may execute instruction 410 to forward at least environmental data messages from the one or more network devices to the NMS over the secure data transfer connection. IAP 508 can begin forwarding syslog messages indicative of monitored environmental conditions at or around IAP 508 (captured by one or more EA asset tags integrated therein) to OpenFlow controller 510 on the established OpenFlow connection. Syslog app 502 (alluded to above) may then consume these syslog messages from OpenFlow controller 510, and forward them to syslog server 512 over the established connection therebetween.

It should be understood that although various embodiments have been described in the context of EA asset tags integrated into network devices, it is contemplated that EA asset tags can be integrated into other types of devices, such as network routers, network bridges, campus APs, and other devices. Moreover, it should be understood that although various embodiments described and illustrated herein involve environmentally aware asset tags, it should be understood that asset tags with this sensor functionality can be leveraged to sense or monitor other aspects of interest to an enterprise. For example, EA asset tags 124A and 124B of FIG. 1B may also be embodied as IoT/sensor tags that can monitor and capture information regarding operating conditions of the fan 120. For example, instead of environmental sensors, accelerometers may be used. Thus, in an alternative embodiment, fan 120 may have sensor tags 124A and 124B that sense the speed of rotation of fan 120, and report that back to NMS 110, for example. In this way, operating conditions of network device 104 along with location information about network device 104 can be gleaned.

Figure 6:
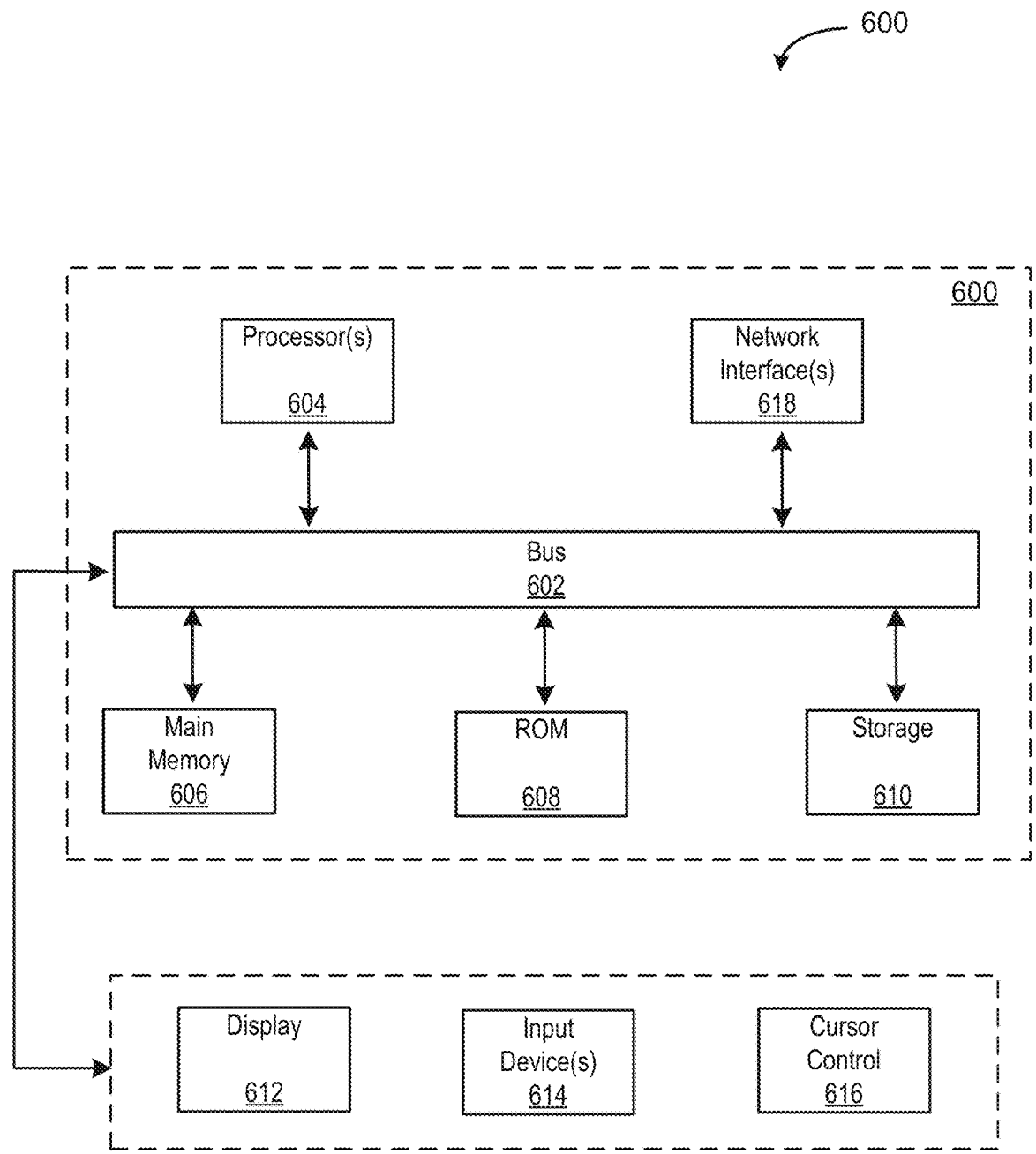
FIG. 6 is an example computing component that may be used to implement various features of embodiments described in the present disclosure.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A network device, comprising:
    a transceiver exchanging communications data with a wireless computing device in a wireless network, wherein the wireless network further comprises a syslog server;
    a first asset tag integrated into the network device, comprising:
        one or more environmental sensors embedded in the first asset tag communicating environmental data external and internal to the network device to a network management server of the wireless network in conjunction with location information obtained from the first asset tag, the network device and the asset tag creating at least a portion of a sensory network, the sensory network further comprising a second asset tag communicating additional location information of a neighboring network device to which the environmental data communicated by the first asset tag is imputed to the neighboring network device when sufficiently proximate to the network device,
    wherein the syslog server receives at least one of the environmental data and the location information from the network device, and forwards the at least one of the environmental data and the location information to the network management server,
    wherein the network device receives an OpenFlow configuration from the network management server pursuant to notifying the network management server of a license assignment to a syslog application, the syslog application consuming the environmental data and the location information from the network device and forwarding the environmental data and the location information to the syslog server, and
    wherein the network device establishes an OpenFlow connection with an OpenFlow controller operatively connected to the syslog application through which the environmental data and the location information pass.

2. The network device of claim 1 comprising one of a wireless access point or a network switch.

3. The network device of claim 1, wherein the first asset tag comprises a location engine broadcasting location information indicative of a location of the network device in the wireless network in conjunction with the environmental data.

4. The network device of claim 1 being configured by obtaining an Internet Protocol (IP) address of the network management server from a dynamic host configuration protocol server upon initial bootup, and downloading a network configuration.

5. The network device of claim 1, generating one or more event handlers in response to a failure event during mutual authentication performed between the network device and the network management system.

6. The method of claim 1, wherein the environmental data comprises data on temperature, motion, air quality, and particulate matter.

7. A method, comprising:
    initializing a network device exchanging communications data with a wireless computing device in a wireless network, wherein the wireless network further comprises a syslog server;
    enabling environmental data collection by one or more environmentally aware asset tags integrated into the network device; and
    transmitting the collected environmental data to at least one of the network management server and another network device, the one or more environmentally aware asset tags creating at least a portion of a sensory network further comprising at least one additional environmentally aware asset tag communicating additional location information of a neighboring network device to which the environmental data communicated by the one or more environmentally aware asset tags is imputed to the neighboring network device when sufficiently proximate to the network device,
    wherein the syslog server receives at least one of the environmental data and the location information from the network device, and forwards the at least one of the environmental data and the location information to the network management server,
    wherein the network device receives an OpenFlow configuration from the network management server pursuant to notifying the network management server of a license assignment to a syslog application, the syslog application consuming the environmental data and the location information from the network device and forwarding the environmental data and the location information to the syslog server, and
    wherein the network device establishes an OpenFlow connection with an OpenFlow controller operatively connected to the syslog application through which the environmental data and the location information pass.

8. The method of claim 7, further comprising generating events in response to mutual authentication failures, and remedying the mutual authentication failures using appropriate event handlers.

9. The method of claim 7, wherein the network device comprises one of an access point or a network switch, and wherein the other network device comprises one of another access point or another network switch.

10. The method of claim 7, wherein the collection and transmission of the environmental data occurs using a REST application programming interface (API) and simple network management protocol (SNMP) daemon.

11. The method of claim 7, further comprising, receiving instructions regarding one or more parameters setting forth operating characteristics of the one or more environmentally aware asset tags.

12. The method of claim 7, wherein the initializing the network device comprises verifying components of the network device are operational.

13. The method of claim 7, further comprising performing mutual authentication of the sensory network and the network management server by exchanging certificates respectively associated with the sensory network and the network management server.

14. A method, comprising:
- establishing a data transfer connection between a sensory network and a network management server through a wireless network comprising a syslog server;
- performing license management to configure one or more network devices within the sensory network and secure the data transfer connection; and
- forwarding environmental data messages from the one or more network devices to the network management server over the secure data transfer connection, the one or more network devices comprising an integrated environmentally aware asset tag, wherein the one or more network devices comprising the sensory network include at least one of an access point in which at least a first environmentally aware asset tag is integrated, a network switch in which at least a second environmentally aware asset tag is integrated, and an asset tag associated with an asset of an enterprise operating the sensory network, the at least second environmentally aware asset tag communicating additional location information of a neighboring network device to which the environmental data messages forwarded by the at least first environmentally aware asset tag is imputed to the neighboring network device when sufficiently proximate to the network device, wherein the syslog server receives at least one of the environmental data and the location information from the network device, and forwards the at least one of the environmental data and the location information to the network management server, wherein the network device receives an OpenFlow configuration from the network management server pursuant to notifying the network management server of a license assignment to a syslog application, the syslog application consuming the environmental data and the location information from the network device and forwarding the environmental data and the location information to the syslog server, and wherein the network device establishes an OpenFlow connection with an OpenFlow controller operatively connected to the syslog application through which the environmental data and the location information pass.

15. The method of claim 14, wherein each of the at least first and second environmentally aware asset tags are associated with unique identifiers enabling selective environmental data collection.

* * * * *